(12) United States Patent
Schmidtler et al.

(10) Patent No.: US 8,693,043 B2
(45) Date of Patent: Apr. 8, 2014

(54) AUTOMATIC DOCUMENT SEPARATION

(75) Inventors: Mauritius A. R. Schmidtler, Escondido, CA (US); Scott S. Texeira, San Diego, CA (US); Christopher K. Harris, San Diego, CA (US); Sameer Samat, San Diego, CA (US); Roland Borrey, Villa Park, CA (US); Anthony Macciola, Chino Hills, CA (US)

(73) Assignee: Kofax, Inc., Irvine, CA (US)

( * ) Notice: Subject to any disclaimer, the term of this patent is extended or adjusted under 35 U.S.C. 154(b) by 3547 days.

(21) Appl. No.: 10/742,131

(22) Filed: Dec. 19, 2003

(65) Prior Publication Data
US 2005/0134935 A1 Jun. 23, 2005

(51) Int. Cl.
G06K 15/00 (2006.01)

(52) U.S. Cl.
USPC ......... 358/1.18; 358/1.1; 358/1.13; 358/1.15; 358/1.9; 358/501; 358/448; 358/450; 400/62; 400/70; 400/76; 707/707; 707/706; 707/705

(58) Field of Classification Search
USPC .......................... 358/1.18, 448, 462, 1.9, 2.1
See application file for complete search history.

(56) References Cited

U.S. PATENT DOCUMENTS

| | | | |
|---|---|---|---|
| 5,159,667 A | | 10/1992 | Borrey et al. |
| 5,344,132 A | | 9/1994 | LeBrun et al. |
| 5,467,433 A | * | 11/1995 | Lamprecht et al. .......... 358/1.15 |
| 5,563,966 A | | 10/1996 | Ise et al. |
| 5,757,963 A | * | 5/1998 | Ozaki et al. .................... 382/209 |
| 5,839,019 A | * | 11/1998 | Ito .................................. 399/45 |
| 6,118,544 A | | 9/2000 | Rao |
| 6,601,026 B2 | * | 7/2003 | Appelt et al. ..................... 704/9 |
| 6,765,685 B1 | * | 7/2004 | Yu .................................. 358/1.13 |
| 6,917,438 B1 | * | 7/2005 | Yoda et al. .................... 358/1.15 |
| 6,921,220 B2 | * | 7/2005 | Aiyama .......................... 400/76 |
| 7,017,108 B1 | * | 3/2006 | Wan .............................. 715/234 |
| 7,081,975 B2 | * | 7/2006 | Yoda et al. .................... 358/474 |
| 7,082,426 B2 | * | 7/2006 | Musgrove et al. ..................... 1/1 |
| 7,251,777 B1 | * | 7/2007 | Valtchev et al. ............. 715/234 |
| 7,266,768 B2 | * | 9/2007 | Ferlitsch et al. ............. 715/273 |
| 7,553,095 B2 | * | 6/2009 | Kimura .......................... 400/62 |
| 7,651,286 B2 | * | 1/2010 | Tischler .......................... 400/62 |
| 7,665,061 B2 | * | 2/2010 | Kothari et al. ................ 717/106 |
| 7,999,961 B2 | * | 8/2011 | Wanda .......................... 358/1.15 |
| 2001/0027420 A1 | * | 10/2001 | Boublik et al. ................ 705/26 |

(Continued)

FOREIGN PATENT DOCUMENTS

EP 0549329 6/1993

OTHER PUBLICATIONS

Collins-Thompson et al., "A Clustering-Based Algorithm for Automatic Document Separation," ACM Special Interest Group in Informaion Retrieval (SIGIR), (2002).*

(Continued)

Primary Examiner — Hilina K Demeter
(74) Attorney, Agent, or Firm — Zilka-Kotab, PC

(57) ABSTRACT

A method and system for delineating document boundaries and identifying document types by analyzing digital images of one or more documents, automatically categorizing one or more pages or subdocuments within the one or more documents and automatically generating delineation identifiers, such as computer-generated images of separation pages inserted between digital images belonging to different categories, a description of the categorization sequence of the digital images, or a computer-generated electronic label affixed or associated with said digital images.

38 Claims, 9 Drawing Sheets

(56) References Cited

U.S. PATENT DOCUMENTS

| | | | |
|---|---|---|---|
| 2002/0069218 A1* | 6/2002 | Sull et al. | 707/501.1 |
| 2003/0210428 A1* | 11/2003 | Bevlin et al. | 358/1.18 |
| 2005/0021360 A1* | 1/2005 | Miller et al. | 705/1 |
| 2005/0050060 A1* | 3/2005 | Damm et al. | 707/100 |

OTHER PUBLICATIONS

Japanese Office Action Summary translation from application No. 2004/047112 mailed on Dec. 22, 2008.

Collins-Thompson et al., "A Clustering-Based Algorithm for Automatic Document Separation," ACM Special Interest Group in Information Retrieval (SIGIR), (2002).

Mohri, "Finite-State Transducers in Language and Speech Processing," Association for Computational Linguistics (1997).

Platt, "Probabilistic outputs for Support Vector Machines and Comparisons to Regularized Likelihood Methods," Advances in Large Margin Classifiers, MIT Press (1999).

Russell and Norvig, "Artificial Intelligence: A Modern Approach," Prentice-Hall, Inc., pp. 70-84 (1995).

Russell and Norvig, "Artificial Intelligence: A Modern Approach," Prentice-Hall, Inc., pp. 531-544 (1995).

Vapnik, "The Nature of Statistical Learning Theory: Second Edition," Springer-Verlag New York, Inc., pp. 138-142 (2000).

Zadronzy et al., "Transforming classifier scores into accurate multiclass probability estimates," Proceedings of the Egypt International Conference on Knowledge Discovery and Data Mining (2000).

\* cited by examiner

AUTOMATIC DOCUMENT SEPARATION

BACKGROUND OF THE INVENTION

1. Field of the Invention

The present invention relates to a system and method for effectively finding document or subdocument boundaries in a sequence of images, such as those produced from a digital scanner.

2. Description of the Related Art

Finding document or subdocument boundaries is useful in the context of processing large quantities of documents and/or subdocuments in accordance with their document or subdocument type. As used herein, the term "document" refers generally to information contained in a medium having a beginning boundary (e.g., first page, first paragraph, etc.) and an ending boundary (e.g., last page, last paragraph, etc.) and a "subdocument" may be any definable subset of information contained in a "document" (e.g., page(s), section(s), paragraph(s), etc.). Hereinafter, "documents" and "subdocuments" are collectively referred to as "documents."

Current methods commonly employed for high volume digital document scanning and subsequent processing of documents include using physical separator sheets to sort the documents, as described in U.S. Pat. No. 6,118,544 to Rao, for example. In large scanning operations the manual effort of inserting physical separator pages prior to scanning can be extremely costly and time consuming. For example, a large loan processing company in the United States currently estimates that in order to process 20 million loan images a month they spend $1 M a year on the printing of separator pages. Additionally they estimate at least 20 seconds of manual effort per loan document. Therefore using separator pages can consume a substantial portion of the total document preparation costs and the level of effort scales linearly with the volume of forms processed.

Under similar volume assumptions, human constructed rule based systems, wherein the categorization and/or separation rules are specified by a human operator, do quite well for certain kinds of tasks. However, while the costs of such a rule based system do not scale linearly with the number of documents processed, they can scale even more poorly as the number of combinations of document types and business rules increases. This is because over time the system is forced to adapt to new constraints, and ensuring that the interaction of behaviors between new and old rules is correct can be cumbersome, time consuming, and requires highly skilled (and consequently expensive) labor.

Only recently has work been done to automate the process of rule generation. The work described in Collins-Thompson et al., "A Clustering-Based Algorithm for Automatic Document Separation," ACM Special Interest Group in Information Retrieval (SIGIR), 2002. (hereinafter "Collins-Thompson"), takes a batch of documents, with the pages in no particular order, and automatically groups pages together from the same document. This work uses a three step method. First, each pair of pages is assigned four similarity scores based on document structure information, text layout information, text similarity, and general image content features. These scores are then used to compute an overall similarity between the two pages. Lastly, the pairs of pages are clustered by similarity score in order to get larger groups of pages that are all similar to each other. The result is a separation of documents in a large set of pages from multiple documents.

The method proposed by Collins-Thompson partitions pages into groups that correspond to documents, it does not attempt to identify what types of documents exist in the collection. However, this approach falls short of addressing the total business problem. Quite often separator pages are inserted between documents in order to instruct the computer where one document begins and another ends as well as to identify the type of document that will follow behind the separator page. Both pieces of information are critical to power certain business processes. The identification of the type of document is used to determine what further processing needs to be done on that particular document. The following example illustrates the value of completing both steps:

A mortgage refinance company wants to automate the document preparation of loan refinance applications. The preparation process today involves inserting bar code separators between each document. The separators tell the computer where one document begins and ends. The bar code tells the computer what document type is behind the separator. Based upon the document type, automated extraction and routing technology can pull out the correct information from each document. Previously, all this work had to be done by hand. Without document type identification the savings through technology is much reduced. Documents would be separated, but unidentified. A human operator would need to look at each document to determine its identification. This process is just as lengthy as looking at each document and inserting a bar code separator page.

Additionally, the system as described by Collins-Thompson was built to separate document pages from each other according to a particular criterion—the pages came from the same document. However, it may be useful to redefine the grouping criteria for a business process. For example, the division of deeds from tax forms might be one separation task. In another business process identifying all forms belonging to a single person might be the desired separation task. The methods used in Collins-Thompson do not allow the user of the system to easily redefine what it means to be similar and thus redefine the separation task. Instead the user would need to reprogram the classification and clustering system as well as reengineer the features used from the document the system uses as input.

BRIEF SUMMARY OF THE INVENTION

The present invention provides a method and system for reducing the manual effort involved in separating and identifying documents or subdocuments after digital scanning. In particular, this method and system yields the benefits of automatically processing most incoming documents, as the manually constructed rule based systems do, but also drastically reducing the configuration time involved in setting up, maintaining, and extending the system. In one embodiment, this is accomplished by using supervised machine learning methods to automatically construct the rules used to separate documents and/or subdocuments.

In a further embodiment, the present invention provides a system and method for applying text and image classification of images and combining those results in a rule-based framework such that the most likely configuration of separations can be found under a set of easily configurable constraints.

In another embodiment, the present invention employs a probabilistic network to generate high quality separations automatically. Probabilistic networks can combine multiple sources of information in a principled way and those skilled in the art can use known inference algorithms to deduce the most likely separation from all available information. Exemplary sources of information include, but are not limited to, sub-document sequence information, graphical information in each image, textual information in each image, distributions of document and/or subdocument frequencies, document and/or subdocument length distributions, and business process rules. The various sources of information to be incorporated into a single probabilistic framework require probability estimation and the construction of the network structure which specifies the independence assumptions made. These assumptions define the information available during estimation and inference of each probability in the network.

In one embodiment, the graphical information of each image is used by a machine learning algorithm to learn classification rules to predict the document or subdocument type of the image. In another embodiment, the machine learning algorithm learns classification rules for each image based on the textual information in the image obtained by optical character recognition (OCR). Additionally, another embodiment can combine the output of these two such classifiers and produce a single output score from them. In another embodiment, these two sets of features are combined into one feature space and one machine learning algorithm that uses all features simultaneously to construct document or subdocument classification rules.

In a further embodiment, output scores from the classification rules can be interpreted as estimated class membership probabilities. This means the scores are well correlated with the true class probability distribution function they are constructed to estimate. Because these scores are calibrated to probabilities, they can be used to make decisions (e.g., Bayes optimal decisions) with respect to misclassification costs and category priors. The calibration of output scores to closely estimate probabilities, allows the combination of different information sources to be more easily accomplished because combining information from various sources is typically performed heuristically with no principled method to determine how to proceed or how much improvement is possible.

In one embodiment, the invention can incorporate rule based methods and systems that generate "hard" probabilities of either 1.0 or 0.0. In other embodiments, the invention incorporates methods and systems which have the ability to estimate smoother probability density functions at higher levels of granularity.

In another embodiment, the invention allows users to specify classification rules or additional constraints on the problem manually. This can be a more efficient method for obtaining constraints and relationships than using machine learning techniques if the relationships/constraints are easy to encode in the network and already known to the users.

In a further embodiment, the invention includes a method of delineating document boundaries and identifying document types, which includes the steps of: automatically categorizing a plurality of document images into a plurality of predetermined categories in accordance with automatically generated classification rules based on sample document images for each of the categories; and automatically generating at least one identifier for identifying which of the plurality of document images belongs to which of the at least two categories.

In one embodiment, the at least one identifier includes a computer-generated separation page which is inserted between document images to delineate images belonging to different ones of the plurality of categories. In another embodiment, the at least one identifier includes a computer-readable description (e.g., an XML message) that identifies a categorization sequence for the plurality of digital images in accordance with their categorization. In yet another embodiment, the at least one identifier includes at least one computer-generated label that is electronically associated with at least one of the plurality of document images.

In accordance with one embodiment of the present invention, due to the configurability of the network structure, and the ability to leverage various methods of rule construction to estimate probabilities of the network, the present invention is easier to maintain and extend to include other forms of information or other kinds of document or subdocument types.

DETAILED DESCRIPTION OF THE PREFERRED EMBODIMENTS

The invention is described in detail below with reference to the figures, wherein like elements are referenced with like numerals throughout.

Figure 1:
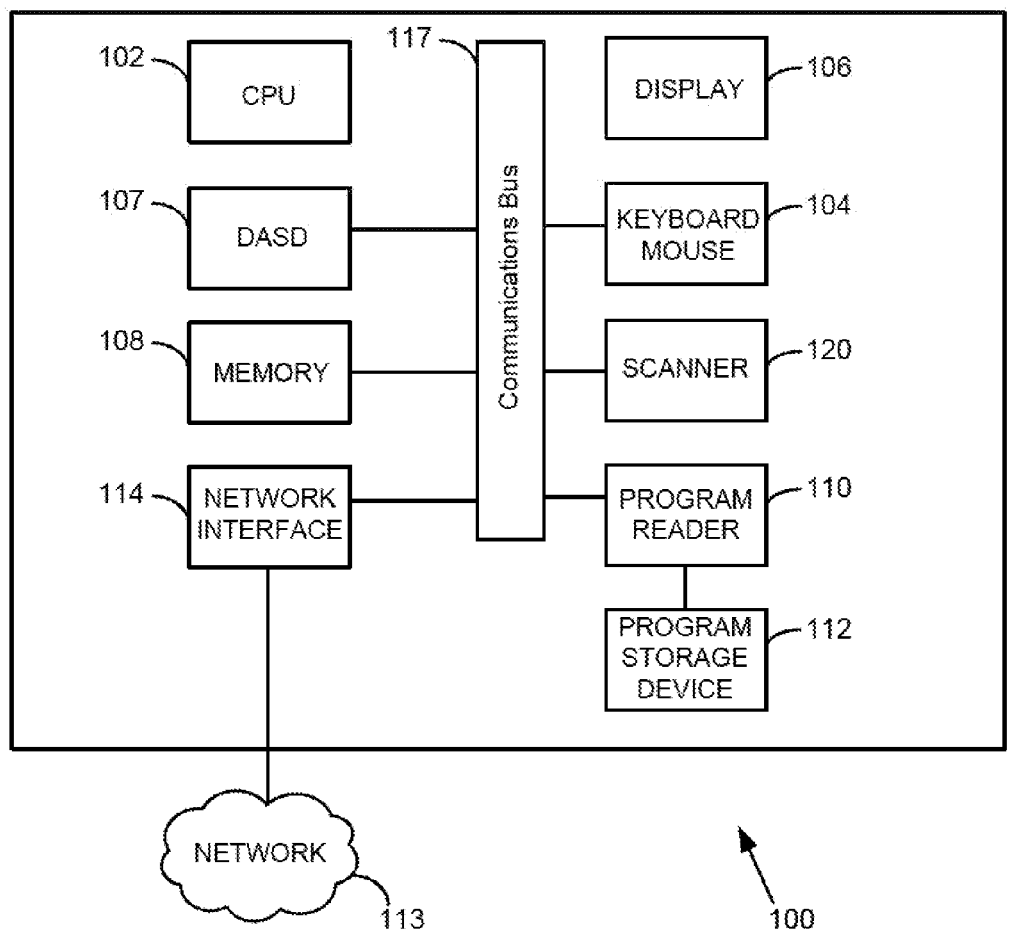
FIG. 1 illustrates a block diagram representation of an exemplary computer system that may be used in accordance with the present invention.

The present invention may be implemented using software on a computer system or other processing system. FIG. 1 is a block diagram of an exemplary computer system 100 capable of carrying out the functionality of the invention described herein. Each computer system 100 operates under control of one or more central processor units (CPUs) 102, such as a "Pentium®" microprocessor and associated integrated circuit chips, available from Intel Corporation of Santa Clara, Calif., USA. The computer system 100 can input commands and data from a keyboard and mouse 104 and a user can view inputs and computer outputs at a display 106. The display is typically a video monitor or flat panel display device. The computer 100 also includes a direct access storage device (DASD) 107, such as a fixed hard disk drive. A memory 108 typically comprises volatile semiconductor random access memory (RAM). Each computer preferably includes a program product reader 110 that accepts a program product storage device 112, from which the program product reader can read data (and to which it can optionally write data). The program product reader can comprise, for example, a disk drive, and the program product storage device can comprise removable storage media such as a floppy disk, an optical CD-Rom disc, a CD-R disc, a CD-RW disc, DVD disc, or the like. Each computer 100 can communicate with other connected computers over a computer network 113 through a network interface 114 that enables communication over a connection 116 between the network 113 and the computer 100. These devices have the ability to communicate with the other devices through a communications bus 117.

The CPU 102 operates under control of programming steps of a software program that is stored on DASD 107 and/or temporarily stored in the memory 108 of the computer 100. When the programming steps are executed, the pertinent system component performs its functions. Thus, in one embodiment, the programming steps implement the functionality of the system described herein. The programming steps can be received from the DASD 107, through the program product 112, or though the network connection 116. The storage drive 110 can receive a program product, read programming steps recorded thereon, and transfer the programming steps into the memory 108 for execution by the CPU 102. As noted above, the program product storage device can comprise any one of multiple removable media having recorded computer-readable instructions, including magnetic floppy disks, CD-Rom, and DVD storage discs. Other suitable program product storage devices can include magnetic tape and semiconductor memory chips. In this way, the processing steps necessary for operation in accordance with the invention can be embodied on a program product.

Alternatively, the program steps can be received into the operating memory 108 over the network 113. In the network method, the computer receives data including program steps into the memory 108 through the network interface 114 after network communication has been established over the network connection 116 by well known methods that will be understood by those skilled in the art without further explanation. The program steps are then executed by the CPU 102 to implement the processing of the system. As known to those skilled in the art, other computing machines and systems having alternative architectures and constructions may be implemented to support the various functions of the invention described herein.

In one embodiment, a digital scanner 120 is coupled to the computer system 100 using any known peripheral bus interface or architecture. The scanner 120 scans analog images (e.g., pages containing graphical and/or textual information) and converts them into digital images or files for processing by the CPU 102. The scanner 120 may be any suitable scanner that is commercially available. In one embodiment, the scanner 120 is a Böwe Bell & Howell 8125, manufactured by Böwe Bell & Howell, located in Lincolnwood, Ill.

Figure 2:
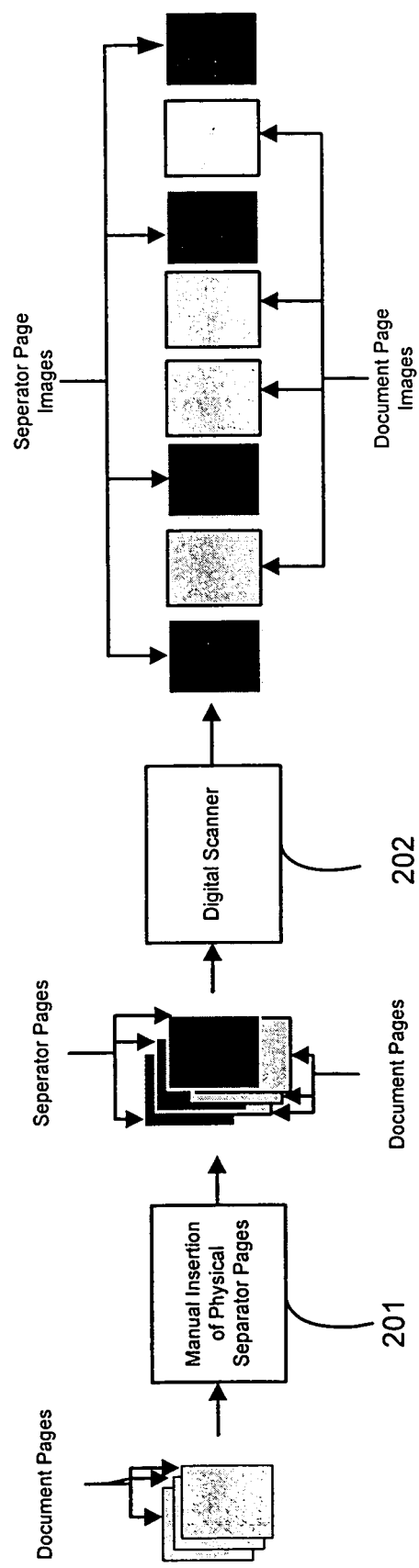
FIG. 2 illustrates a process flow diagram of a prior art document separation procedure.

In one embodiment, the present invention is designed to improve prior art processes that use separator pages to delineate documents. An exemplary prior art process is illustrated in FIG. 2. Starting at step 201, a collection of document pages is processed by a person manually inserting physical separator sheets between pages that correspond to different document types or sections of interest. The sections of interest depend on the application and the further processing required on each document. At step 202 the collection of documents and separator pages are then fed into a digital scanner and a sequence of digital images representing every page is produced, including the separator pages. This sequence of images can then be further processed by further software components residing within the system 100, based on their document or subdocument type as identified and demarcated by the separator pages. Document or subdocument specific processing is now possible because the images of separator pages delineate the documents or subdocuments and are easy to detect by the system 100.

Figure 3:
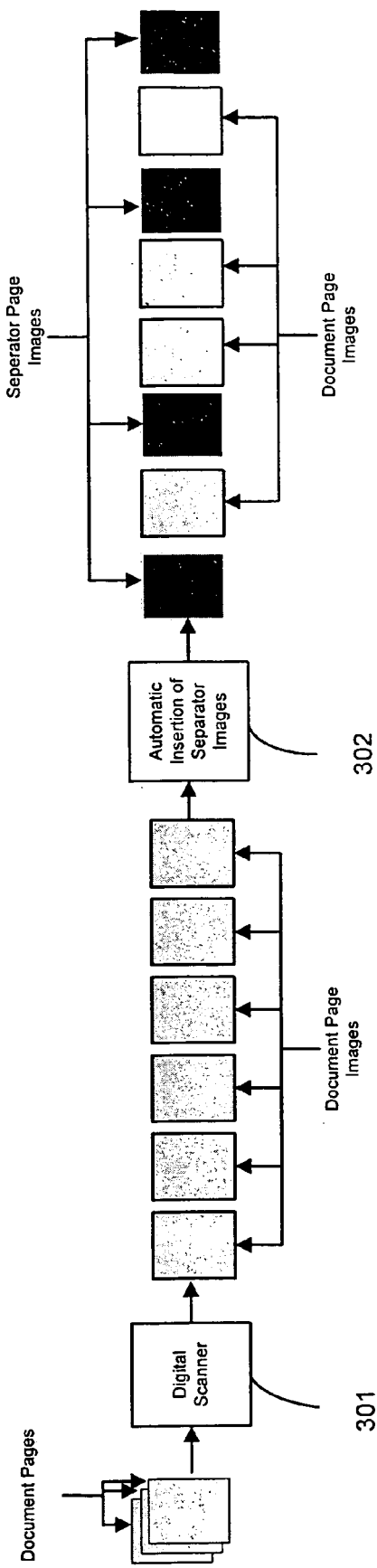
FIG. 3 illustrates a process flow diagram of a document separation procedure, in accordance with one embodiment of the invention.

The present invention automates the process of delineating document or subdocument groups of pages. One embodiment is illustrated in FIG. 3. Starting at step 301, the document pages are inserted into the digital scanner 120 and converted into a sequence of digital images. This sequence of digital images is then processed in accordance with the present invention at step 302. The output of step 302 is the same as the output at step 202, namely a sequence of the digitized pages interleaved with automatically generated images of separator sheets. The difference being that at step 302 the present invention has automatically inserted the separator sheet images into the image sequence. In one embodiment, the software generated separator pages also indicate the type of document that immediately follows or precedes the separator page. Methods of how the invention determines the type of separator page and where to insert the separator page are discussed in further detail below, in accordance with the various embodiments of the invention.

Figure 4:
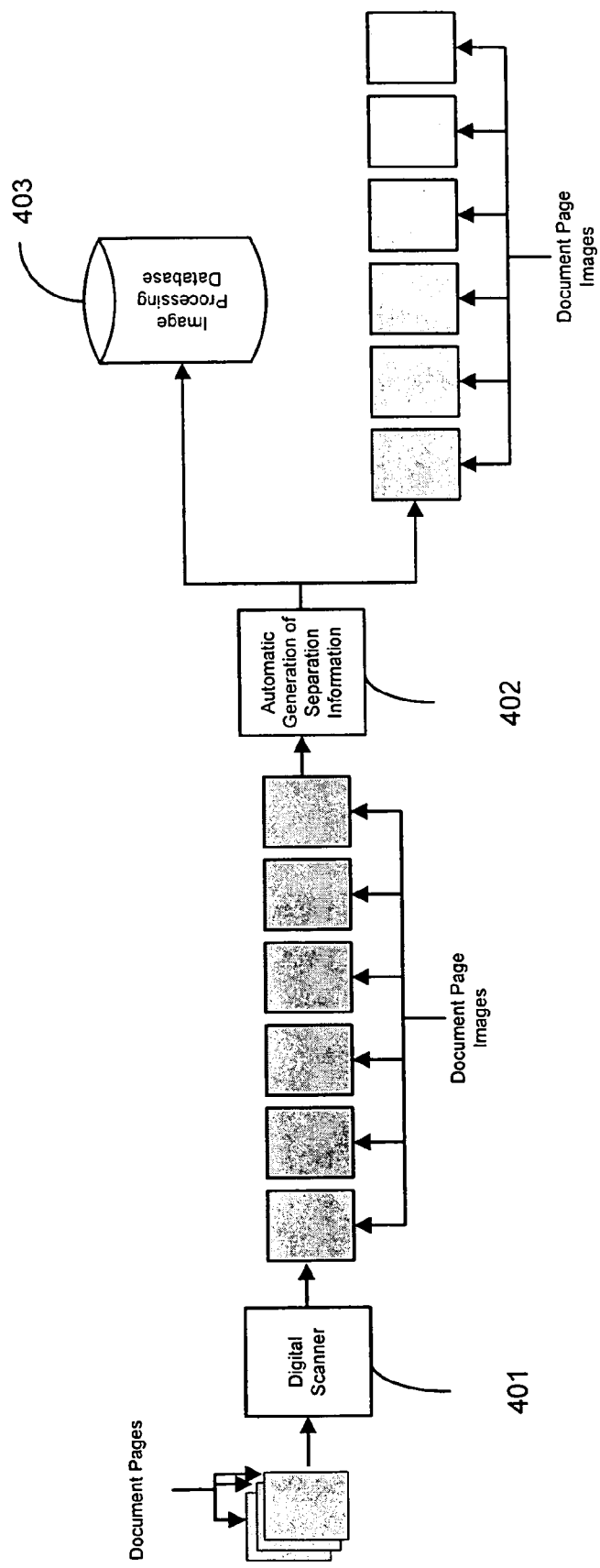
FIG. 4 illustrates a process flow diagram of a document separation procedure, in accordance with another embodiment of the invention.

Further economies can be obtained if the workflow's routing system is configured to interpret document sequence information directly, freeing future subsystems from processing or storing separator images. This alternative embodiment is illustrated in FIG. 4. Starting at step 401, the pages are inserted into the digital scanner and converted into a sequence of digital images. This sequence of digital images is then processed in accordance with the present invention at step 402. At this step, instead of inserting separator sheet images into the sequence of digital images, step 402 outputs the original digitized image sequence unaltered and additionally outputs a description of the sequence of images. This description allows document or subdocument boundaries to be interpreted by the computer system 100. In one embodiment, this description is an XML message that is read and processed by the system 100 in order to determine document boundaries and types. An exemplary XML message corresponding to the document separation is provided below:

```
<SeparationDescription>
    <Section type="FormA">
        <Image SeqOffset="1"/>
    </Section>
    <Section type="FormB">
        <Image SeqOffset="2"/>
        <Image SeqOffset="3"/>
    </Section>
    <Section type="FormC">
        <Image SeqOffset="4"/>
    </Section>
</SeparationDescription>
```

Those skilled in the art, however, will recognize that alternative methods exist for generating and providing the sequencing information. For example, in one embodiment, the computer system 100 may insert or affix an electronic label or other identifier onto each scanner-generated digital image to identify the first, last and any intermediate pages of each form in a series of forms. Subsequent processing of these page images is then performed in accordance with the label or identifier for each page.

In one embodiment, the present invention constructs and combines classification rules to automatically separate sequences of pages. The set of rules are defined by a probabilistic network. In one embodiment, this network can be implemented as a finite state transducer, a well known form of finite state machine (FSM), as described, for example, in Mohri, M. "Finite-State Transducers in Language and Speech Processing," Association for Computational Linguistics, 1997 (hereinafter "Mohri"). In accordance with one embodiment, the type of FSM discussed herein can be represented as one or more state transition or decision points having input arcs that represent an input value, state or item (e.g., a digital image of a page) and output arcs that represent a possible next value, state or item. As known in the art, each state transition or decision point accepts inputs on the input arcs, outputs on the output arcs, and in one embodiment, has a probability weight value associated with the input and/or output arcs. The input and output arcs can also represent the empty value or symbol, often referred to as $\epsilon$ (epsilon). In one embodiment, this probability weight value is interpreted as the negative log of a probability, where P is the probability represented by an arc.

Figure 5:
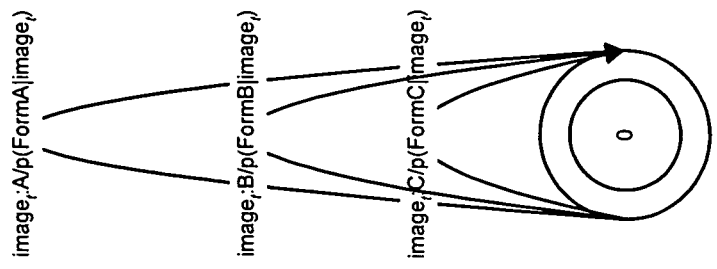
FIG. 5 illustrates an exemplary finite state machine diagram or probabilistic network diagram for separating three different form or document types, in accordance with one embodiment of the invention.

FIG. 5 illustrates a graphic representation of a simple FSM or probabilistic network designed to separate three forms or subdocuments within a single document. The FSM includes a single transition state or point having three arcs, each arc representing both input and output states. The information on each arc before the colon is the input item. In the case of FIG. 5 it is an input image. This input image is indexed with a t subscript to indicate that in a sequence of images, each image will be considered in turn as the input for that arc (e.g. $image_0$ will be the first input, image, next, etc.). The information after the colon, but before the "/" is the output. In this case it is either an "A," "B," or "C," corresponding to assigning the page to one of the three forms: FormA, FormB, or FormC. The information to the right of the "/" is the probability of the event being modeled. As known to those of skill in the art, a transducer maps one "regular language" to another "regular language." In this case, the transducer in FIG. 5 maps a sequence of images into a sequence of A, B, and C symbols and their associated probabilities. In fact, when the transducer in FIG. 5 is applied to an incoming sequence of images, all possible combinations of subsequences of forms are enumerated along with their probability of occurring. A graph search algorithm can then be used to find the sequence of forms given that sequence of images with the highest probability. Exemplary graph search algorithms are depth first search and breadth first search algorithms, which are well known in the art and described, for example, in Russel, S., Norvig, P., "Artificial Intelligence: A Modern Approach," Prentice-Hall, Inc., 1995, pp. 70-84, 531-544. For the transducer in FIG. 5, this is the same as choosing the most likely form given each image in a greedy fashion. This is because each image is considered in isolation of the other images and without regard to which forms other images were assigned. However, for arbitrary network structures wherein a plurality of form types may exist, the sequence with the highest probability is not necessarily the sequence constructed by selecting the highest image-to-form probability arc for each image in turn. This is because it is possible that certain sequences of forms are more or less likely based on other factors, such as the length (in pages) of a form or probabilities associated with preceding or subsequent images, for example.

In FIG. 5, the first, largest arc labeled as "$image_t$:A/p (FormA|$image_t$)" represents one possible path or outcome of the FSM and provides the probability that a scanned image is a "Form A" image. The second, middle arc labeled as "$image_t$:B/p(FormB|$image_t$)" represents another possible path or outcome of the FSM and provides the probability that the scanned image is a "Form B" image. Similarly, the smallest arc labeled "$image_t$:C/p(FormC|$image_t$)" provides the probability that the image is a "Form C" image. In one embodiment, the probability associated with each path is generated by analyzing the textual and/or graphical content of each image and then comparing this content with known models or training sets associated with each category or form type. An exemplary method and system for performing this type of analysis and probabilistic classification is described in U.S. patent application Ser. No. 60/341,291, entitled "Effective Multi-Class Support Vector Machine Classification," filed on Mar. 10, 2003, Attorney Docket No. 52923-2000800, the entirety of which is incorporated by reference herein (hereinafter "Harris").

Figure 6:
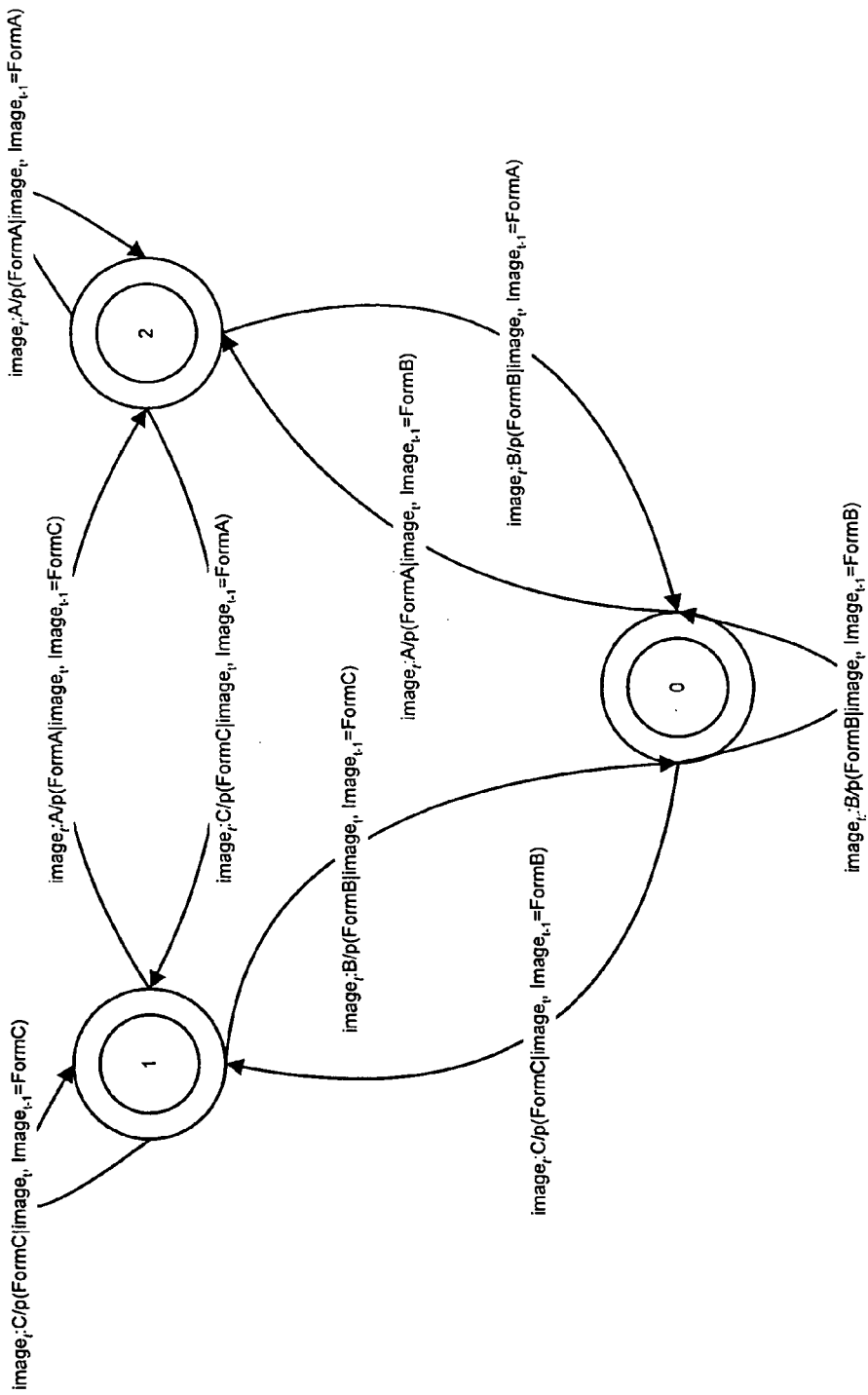
FIG. 6 illustrates an exemplary finite state machine diagram, in accordance with a further embodiment of the invention.

FIG. 6 shows a more complex transducer that represents another embodiment of the present invention to solve the same problem. This transducer's arc probabilities depend on the incoming image (denoted $image_t$) and to which form the previous image was assigned (denoted $image_{t-1}$). For example, the arc labeled "$image_t$:A/p(FormA|$image_t$, $image_{t-1}$=FormA)" represents one possible path or outcome of the FSM and provides the probability that the scanned image is a "Form A" image given properties of the current image, $image_t$, and the information that the previous image was a "Form A" image. Alternatively, the arc labeled "$image_t$: A/p(ForA|$image_t$, $image_{t-1}$=FormB)" would produce a different probability for the same input image because this arc uses the information that the previous image, $image_{t-1}$, was a "Form B" image and not a "Form A" image. By utilizing the information about the classification of the previous image, this FSM can be more discriminative in how it classifies the current image. By constructing the FSM this way a more complex probability model for the problem at hand is expressed.

In a further embodiment the construction and optimization of FSMs can be done using the methods of relational algebra as described in, for example, Mohri. As known to those skilled in the art, the input (or similarly output) side of a transducer represents a regular language. In one embodiment, the regular languages are sets, possibly infinite, of input (output) sequences of images (forms). Therefore, set operations such as union, cross product, negation, subtraction, and intersection can be performed on groups of transducers to produce other transducers. Additionally, a transducer is a rational function and therefore operations such as projection and composition are also possible as described in Mohri, for example. These operations have proven useful in constructing, manipulating, and optimizing transducers as described in Mohril.

Figure 7:
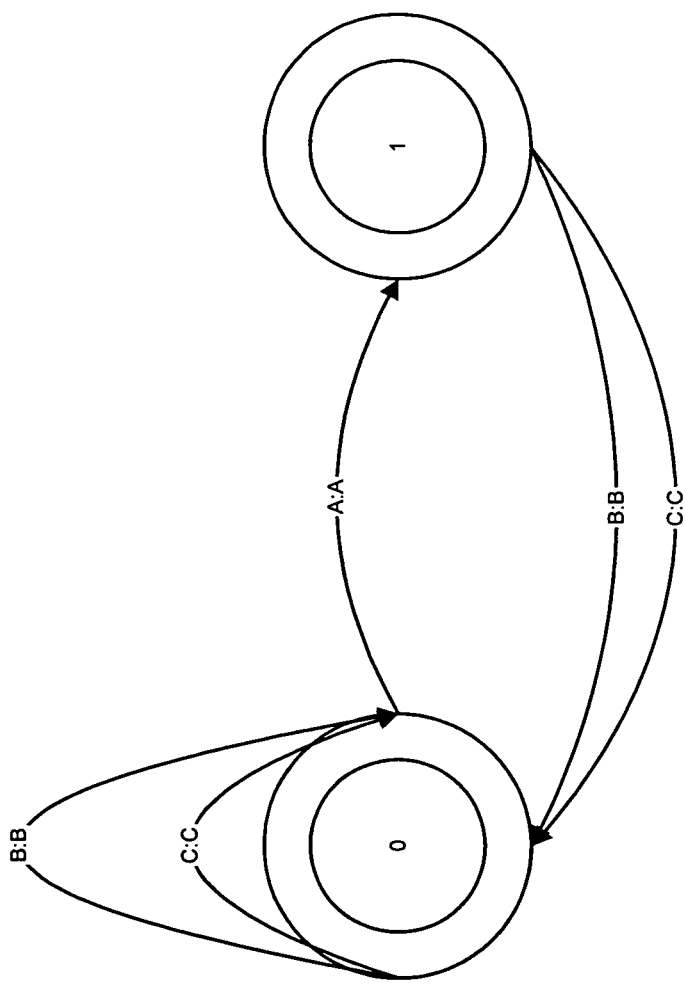
FIG. 7 illustrates an exemplary finite state machine diagram, in accordance with another embodiment of the invention.

For example, suppose FIG. 6 was almost correct, but the user wished to disallow a sequence of two consecutive images being assigned to FormA. Perhaps this would be enforcing a business rule that FormA is a one page form and cannot appear next to another FormA. The transducer in FIG. 7 is an FSM that, when composed with the FSM in FIG. 6 yields exactly the desired result. In FIG. 7, the arcs are labeled with both input and output arcs being form type symbols ("A," "B," or "C") and do not have probabilities. The input symbols are form types because this FSM is designed to take as input the output of an FSM such as that described in FIGS. 5-6. Additionally, there are no probabilities on the arcs because this FSM is not designed to judge certain paths to be more likely or preferable than others; it is designed simply to allow or disallow sequences of form types. This can be thought of as equivalently assigning all paths with a sequence of two FormA images a 0 probability and all other paths a 1.0 probability. For example, the arc labeled "A:A" means that the FSM maps a FormA symbol to a FormA symbol unconditionally. Similarly the arcs labeled "B:B" and "C:C" map FormB symbols to FormB symbols and FormC symbols to FormC symbols respectively. Notice that these arcs do not change the form type for any image that was determined using an FSM such as the ones in FIGS. 5-6, it only removes sequences with two FormA type images. This is because once an "A" symbol is read in the only acceptable outgoing arcs are "B" and "C." Therefore, any paths containing two consecutive "A" output symbols are going to be discarded during the graph search algorithm used to find the best solution.

Figure 8:
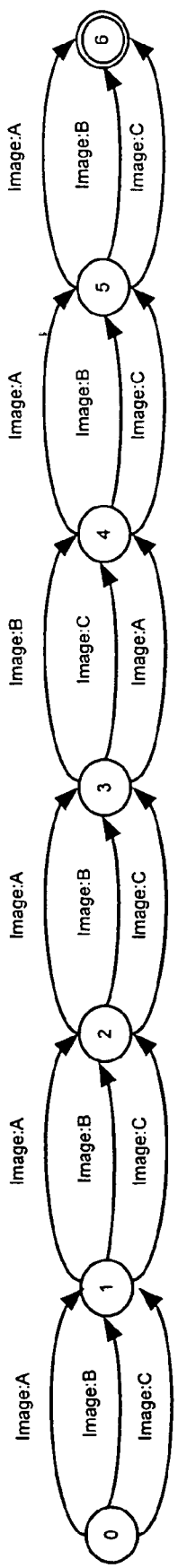
FIG. 8 provides a graphic representation of all possible combinations of form sequences for six input images given the finite state machine of FIG. 5.
Figure 9:
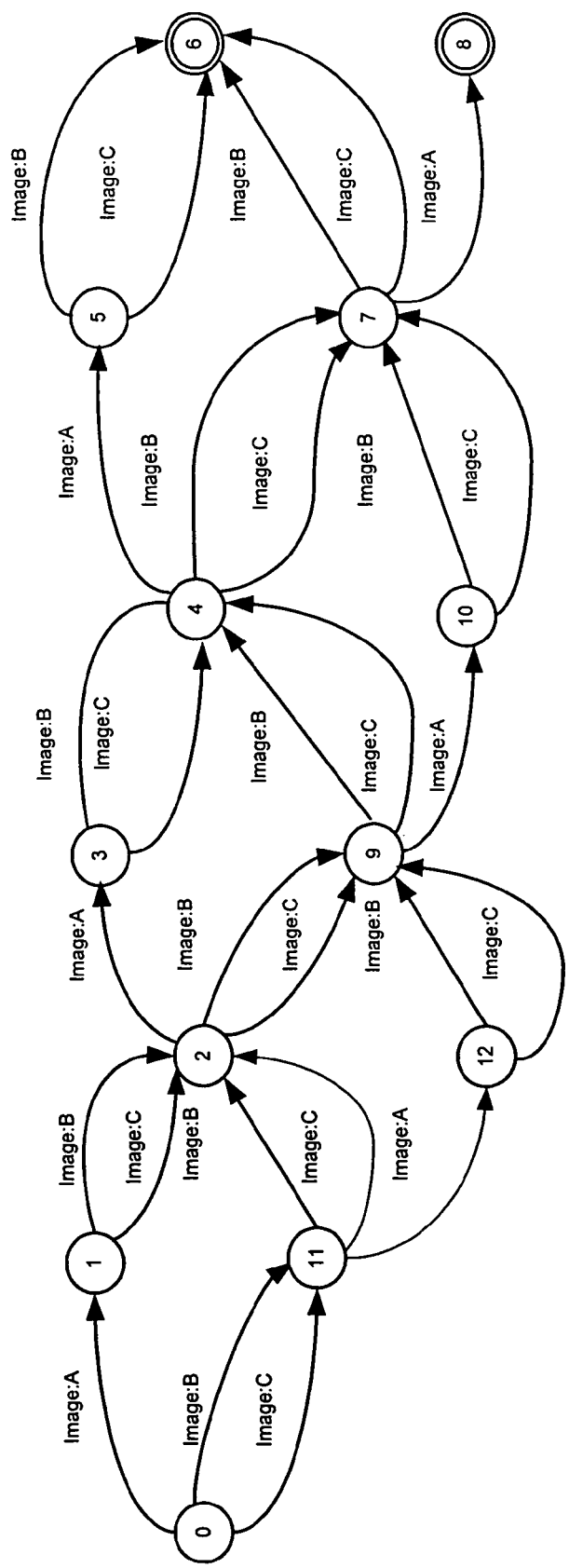
FIG. 9 provides a graphic representation of possible combinations of form sequences after applying the filter transducer of FIG. 7 to the transducer of FIG. 5, in accordance with one embodiment of the invention.

FIG. 8 shows the representation of all combinations of form sequences for six input images given the transducer in FIGS. 5. There are 720 possible form sequences for six input images depicted in FIG. 5. After applying the filter in FIG. 7, using weighted FSM composition as described in Mohri, all sequences with two FormA images next to each other are removed; this is illustrated in FIG. 9. Note that while the number of states and arcs is larger in FIG. 9 than in FIG. 8, the number of unique sequences or paths is smaller in FIG. 9. There are only 448 sequences of forms for the six input images in FIG. 9; the other 720−448=272 sequences all have two consecutive Form A's in them and thus were removed as possible sequences.

In this framework, probabilistic and custom-application rules (e.g., two consecutive Form A images are not allowed) utilizing per-image information, per-form sequence information, sequence of image information, and sequence of form information can all be combined in a principled way to constrain the set of acceptable sequences and subsequently optimized to find the acceptable sequence with the highest probability.

In one embodiment the present invention uses well known machine learning techniques to construct the classification rules on each arc. Exemplary techniques are Neural Networks, as described in Bishop, C., "Neural Networks for Pattern Recognition," Oxford University Press, Inc. 2002, pp. 27, 77-85, 230-247, 295-300, and 343-345 (hereinafter "Bishop"), Support Vector Machines, as described in Vapnik, V. "The Nature of Statistical Learning Theory: Second Edition," Springer-Verlag New York, Inc. 2000, pp. 138-142 (hereinafter "Vapnik") and Harris, for example. Other techniques include utilizing learned decision trees, as described in Russell, S. and Norvig, P., "Artificial Intelligence: A Modern Approach," Prentice-Hall, Inc. 1995, pp. 531-544, for example. In another embodiment, these methods output calibrated output probabilities as described, for example, in Bishop and Harris, as well as Zadrozny, B. et al., "Transforming classifier scores into accurate multiclass probability estimates," Proceedings of the Egypt International Conference on Knowledge Discovery and Data Mining, 2002, and Platt, J. C., "Probabilistic outputs for Support Vector Machines and Comparisons to Regularized Likelihood Methods," Advances in Large Margin Classifiers, MIT Press 1999, so that optimization of the networks discussed above are done in a principled manner.

In conjunction with the application of classification and probabilistic rules, the invention further incorporates custom application or "filter" rules, which are tailored for each application based on known characteristics of each document, subdocument, form or other item. For example, as discussed above, in a particular application, it may be known that Form A is only a single page form. Therefore, all possible paths of the FSM which result in two consecutive Form A's are eliminated from the FSM. As another example, it may be known that Form C is always three pages long. Therefore, a custom rule that a starting page for Form C must be followed by a middle and ending page may be implemented to eliminate any paths that don't satisfy this custom rule. These are only a few examples of many possible custom rules that may assist in classifying and separating documents or other items for subsequent handling/processing.

A document separation program, in accordance with one embodiment of the present invention, was constructed using only textual features from each image to separate groups of pages into different loan application forms. There were 20 different possible forms but only 13 of these forms had more than 25 example pages; therefore, classifiers were only built for these 13 forms. The examples consisted of 25,526 loan application pages. These pages were digitally scanned using a Böwe Bell & Howell 8125 digital scanner, manufactured by Böwe Bell & Howell, located in Lincolnwood, Ill. and a single .tif file was produced for each document page. These images were then processed by a third party optical character recognition (OCR) package called AbbyyOCR manufactured by Abbyy Software House, located in Moscow, Russia. The OCR processing resulted in a single ASCII text file for each page.

All text files corresponding to a single loan application were sent to the program. The sequence of ASCII encoded text files were saved to disk with filenames that included the loan application #. These individual text files were then hand classified according to one of the 20 form types, and numbered in the order they appeared in the loan application.

For each of the 13 forms used to construct classifiers, three categories were built, Form_start, Form_mid, and Form_end. These three classes were constructed to represent the pages which appeared first in the form, the middle pages of the form, and the final pages of the form respectively. For forms containing three or more pages; page 1 was assigned to Form_start, the final page was assigned to Form_end, and all other pages were assigned to Form_mid. For forms containing only two pages the first and last forms were assigned to Form_start and Form_end respectively; additionally both the first and last pages were assigned to Form_mid. Finally, for forms which were only one page in length, this page was assigned to all three categories. Therefore, 13 form types×3 categories per form type resulted in the construction of 39 binary classifiers. Each one was constructed to output a probability of class membership (e.g. p(LoanApplication_start|Image), p(Appraisal_end|Image), etc.) as discussed in Harris. The positive class in each case was defined by examples in that class (e.g. Appraisal_end) and the negative class examples were all other pages (including the ones that were part of the 7 forms for which no classifier was built). To test the effectiveness of the document separation, a test set was constructed with the same method used to build the training set. This set had 5,357 pages from the 20 different forms.

The results of using only the 39 textual page-by-page classifiers in a configuration similar to FIG. 5 are often invalid sequences. One cause of invalid sequence is that a page will be incorrectly classified into Form_end before a page appearing before it had been assigned to Form_start. Another form of error is when a form would start, then another form would start, then the first form would end, then the second form would end. These sequences are nonsensical, so a filter FSM was built that enforced the following filter rule: once a Form_start is assigned to a page, the next pages must all be assigned to either the corresponding Form_mid or Form_end; once a Form_end is assigned to a page, pages may only be assigned to Form_start. This results in only valid sequences being produced. Given the simple structure of the exemplary FSM described above, adding the remaining 10 forms to this FSM in a similar way is a routine procedure to those skilled in the art. Next the depth first search graph search algorithm was applied to the resulting FSM in order to find the most likely sequence of forms given that sequence of pages. This sequence is defined by the assignment of pages to forms using the rules constructed automatically by the text based classifier. The only deviation from the highest probability per-page assignment of pages to forms in the sequence found is that the sequence found must be "acceptable" in the sense that it fulfills the constraint mentioned earlier, namely that (a) forms cannot overlap and (b) must start before they end. Using this program on the test set resulted in the following automatic form separation performance:

| NAME | TP | FP | FN | Precision | Recall | F-Measure |
|---|---|---|---|---|---|---|
| AppraisalOrigination | 22 | 1 | 4 | 95.65% | 84.62% | 89.80% |
| FinalLoanApplication | 101 | 9 | 9 | 91.82% | 91.82% | 91.82% |
| FloodCertificate | 34 | 0 | 0 | 100.00% | 100.00% | 100.00% |
| HUD1Settlement | 100 | 9 | 15 | 91.74% | 86.96% | 89.29% |
| Note | 431 | 8 | 18 | 98.18% | 95.99% | 92.62% |
| OriginationFundingTransmittal | 69 | 1 | 10 | 98.57% | 87.34% | 92.62% |
| OriginationHUDReqCopyTaxForm | 40 | 117 | 57 | 25.48% | 98.97% | 99.48% |
| OriginationInitialEscrow | 81 | 0 | 1 | 100.00% | 98.78% | 99.39% |
| OriginationLimitedPowerOfAttorney | 105 | 2 | 6 | 98.13% | 94.59% | 96.33% |
| OriginationMiscRiders | 24 | 24 | 18 | 50.00% | 57.14% | 53.33% |
| OriginationTitleCommitment | 24 | 8 | 15 | 75.00% | 61.54% | 67.61% |
| OriginationTruthInLending | 103 | 3 | 5 | 97.17% | 95.37% | 96.26% |
| OriginationUnrecordedMortgage | 85 | 7 | 17 | 92.39% | 83.33% | 87.63% |
| Summaries (Known forms) | 1219 | 189 | 175 | 86.58% | 87.45% | 87.01% |

The column "NAME" corresponds to the name of the form being examined. The columns "TP," "FP," and "FN" indicate the true positive, false positive and false negative form separations made by the system, respectively. Precision is defined as TP/(TP+FP) and Recall is defined as TP/(TP+FN). F-measure is defined as the harmonic average between precision and recall. In the table above each TP, FP, and FN is a complete form (e.g. a sequence of images). Therefore if a 3 page AppraisalOrigination form was incorrectly split up into a 2 page AppraisalOrigination form followed by a 1 page AppraisalOrigination form this would result in 2 FP and 1 FN for AppraisalOrigination. If the same 3 page form was incorrectly identified as a 3 page Note, it would be scored as 1 FP for Note, and 1 FN for AppraisalOrigination.

Another type of mistake made by this procedure was to have a long sequence of pages in one form split into two sequences of that form right next to each other. For example a single 4 page form might be split into two adjacent 2 page forms. In the particular loan processing application being done, it was impossible for two occurrences of any type of form to appear in the same loan application. Therefore, in another embodiment, a filter similar to the one in FIG. 7 was constructed to remove repeated forms appearing right next to each other. Thus, if the text classifier wanted to assign all four pages to the same form type, they would be forced into one sequence of 4 pages instead of the two sequences of two pages. This improved the accuracy of the system dramatically. The filter was constructed in about an hour which enforced a custom business rule particular to this loan application problem. The performance results of this system with the additional filter rule is provided in the table below:

The above results demonstrate the utility of the present invention in being able to incorporate custom filter rules to improve the automatic classification and separation of documents and/or other items. In one embodiment, filter rules may be constructed manually using known characteristics, features, etc. of the documents or items being processed. In another embodiment, the filter rules may be automatically constructed using known machine learning techniques utilizing training sets of exemplary documents or items as described in to achieve a very accurate system with very little time required to configure or adapt the system.

In another embodiment the previous invention was integrated into a large scale process for digitally scanning and processing loan applications. This process uses Kofax Ascent Capture 5.51 software for managing workflow and integration with 19 Bell & Howell 8125 digital scanners and 22 human reviewers. The integration was done using the method of returning an XML message as described above. This integration included the returning of a per-form "confidence score" which is simply the average of all per-page probabilities that were assigned to each form. Because this process is very sensitive to false positives, forms which had a confidence score lower than 95% are routed by Ascent to a human for review. This review is performed manually, at a computer terminal, and the appropriate form/forms assigned to the sequence of pages are then determined by the human reviewer and the pages are then processed in accordance with their designated form type. By moving the manual form separation step to a computer terminal, eliminating the need to print physical separator pages, it is estimated that over $1,000,000 may be saved annually for this process. The amount of human

| NAME | TP | FP | FN | Precision | Recall | F-Measure |
|---|---|---|---|---|---|---|
| AppraisalOrigination | 22 | 0 | 4 | 100.00% | 84.62% | 91.67% |
| FinalLoanApplication | 103 | 3 | 7 | 97.17% | 93.64% | 95.37% |
| FloodCertificate | 34 | 0 | 0 | 100.00% | 100.00% | 100.00% |
| HUD1Settlement | 101 | 5 | 14 | 95.28% | 87.83% | 91.40% |
| Note | 431 | 0 | 18 | 100.00% | 95.99% | 97.95% |
| OriginationFundingTransmittal | 69 | 1 | 10 | 98.57% | 87.34% | 92.62% |
| OriginationHUDReqCopyTaxForm | 96 | 0 | 1 | 100.00% | 98.97% | 99.48% |
| OriginationInitialEscrow | 81 | 0 | 1 | 100.00% | 98.78% | 99.39% |
| OriginationLimitedPowerOfAttorney | 105 | 2 | 6 | 98.13% | 94.59% | 96.33% |
| OriginationMiscRiders | 31 | 0 | 11 | 100.00% | 73.81% | 84.93% |
| OriginationTitleCommitment | 24 | 1 | 15 | 96.00% | 61.54% | 75.00% |
| OriginationTruthInLending | 103 | 3 | 5 | 97.17% | 95.37% | 96.26% |
| OriginationUnrecordedMortgage | 88 | 0 | 14 | 100.00% | 86.27% | 92.63% |
| Summaries (Known forms) | 1288 | 15 | 106 | 98.85% | 92.40% | 95.51% | time saved by automatically separating the vast majority of forms is an additional savings that is even more significant given that it takes a human approximately 20 seconds to physically insert the separator sheets between forms in a single loan application and a single loan processing company may receive over 20 million loan applications per month. The automatic form separation system described above was deployed for this project in two weeks. This is a significant improvement over the time it takes to configure traditional rule based systems, which is normally measured in months, and the present invention shows significantly more accurate results than has ever been reported on this task for any automatic system.

Once the human reviewers process enough pages, 25 for example, the classifiers are retrained in order to build better estimates of the per-page probabilities. One particularly helpful occurrence of this is when enough pages are manually reviewed to allow the addition of a new form type model. This allows the automatic classifiers to process an additional category of form types in the future. As documents, subdocuments or forms are identified and separated, electronic separator sheets or labels may be "inserted" to identify each form type. For example, these separator sheets may be in the form of actual computer-generated images that become part of the digitized document image sequence, or an XML description or other electronic label that may be electronically associated with each page in the sequence of documents or subdocuments or other items.

Although the invention has been described above in the context of delineating and identifying bank loan documents, those of ordinary skill in the art can implement the invention, using no more than routine experimentation, to provide novel document delineating and identifying methods and systems in the context of processing other types of documents such as insurance forms, tax forms, employment forms, healthcare forms, business invoices, for example, based on desired classification rules.

As described above, the invention provides an improved method and system for reliably and efficiently performing automatic separation of documents, subdocuments or other items of interest using a combination of classification and/or probabilistic rules, on the one hand, and custom-made filter rules, on the other. One of ordinary skill in the art will appreciate that the above descriptions of the preferred embodiments are exemplary only and that the invention may be practiced with modifications or variations of the techniques disclosed above. Those of ordinary skill in the art will know, or be able to ascertain using no more than routine experimentation, many equivalents to the specific embodiments of the invention described herein. Such modifications, variations and equivalents are contemplated to be within the spirit and scope of the present invention as set forth in the claims below.

What is claimed is:

1. In a computer-based system, a method of delineating document boundaries and identifying document types, comprising: automatically categorizing a plurality of document images into a plurality of predetermined categories in accordance with classification rules for said categories; and automatically generating at least one identifier for identifying which of said plurality of document images belongs to which of said at least two categories.

2. The method of claim 1 wherein said at least one identifier comprises a computer-generated separation page which is inserted between document images to delineate images belonging to different ones of said plurality of categories.

3. The method of claim 1 wherein said at least one identifier comprises a computer-readable description that identifies a categorization sequence for said plurality of digital images in accordance with their categorization.

4. The method of claim 3 wherein said computer-readable description comprises an XML message.

5. The method of claim 1 wherein said at least one identifier comprises at least one computer-generated label that is electronically associated with at least one of said plurality of document images.

6. The method of claim 1 wherein said plurality of categories comprises at least two different form types used in a financial transaction.

7. The method of claim 6 wherein said plurality of categories further comprise first, middle and end page categories for each of said at least two different form types.

8. The method of claim 1 wherein said step of automatically categorizing comprises: producing an output score for each document image; and using a graph search algorithm to determine an optimum categorization sequence from a plurality of possible categorization sequences for said plurality of document images based on said output scores.

9. The method of claim 8 wherein said output scores represents a probability that each document image belongs to at least one respective category from said plurality of categories.

10. The method of claim 8 wherein said step of using a graph search algorithm comprises: using a graph structure to calculate a total output score, based on said output scores for each of said plurality of document images, for each said possible categorization sequence; and determining which categorization sequence yields the highest total output score.

11. The method of claim 8 wherein said output scores represent a conditional probability that each document image belongs to at least one respective category from said plurality of categories, wherein said conditional probability for each document image depends on at least one category chosen for at least one preceding or subsequent document image.

12. The method of claim 8 wherein said step of automatically categorizing further comprises applying a manually generated classification rule that eliminates at least one possible categorization sequence.

13. The method of claim 12 wherein said at least one possible categorization sequence comprises a starting page of a first document type followed by a starting page of a second document type before an ending page of the first document type is identified.

14. The method of claim 12 wherein said at least one possible categorization sequence comprises two consecutive pages of a first document type known to have a predefined number of pages.

15. The method of claim 1 wherein said at least one document comprises a plurality of bank loan documents.

16. The method of claim 1 wherein said at least one document comprises a plurality of insurance forms.

17. The method of claim 1 wherein said at least one document comprises a plurality of tax forms.

18. The method of claim 1 wherein said at least one document comprises a plurality of employment forms.

19. The method of claim 1 wherein said at least one document comprises a plurality of healthcare forms.

20. The method of claim 1 wherein said at least one document comprises a plurality of invoice forms.

21. In a computer-based system, a method of delineating document boundaries and identifying document types, comprising:
automatically categorizing a plurality of document images into a plurality of predetermined categories in accordance with classification rules for said categories, comprising:

producing an output score for each document image; and
using a graph search algorithm to determine an optimum categorization sequence from a plurality of possible categorization sequences for said plurality of document images based on said output scores, comprising:
using a graph structure to calculate a total output score, based on said output scores for each of said plurality of document images, for each said possible categorization sequence; and
determining which categorization sequence yields the highest total output score; and
automatically generating at least one identifier for identifying which of said plurality of document images belongs to which of said at least two categories, wherein said graph structure is implemented using a finite state transducer wherein said plurality of document images comprise inputs and said plurality of categorization sequences comprise outputs.

22. The method of claim 21 wherein said graph structure is implemented using a weighted finite state transducer having said plurality of document images as inputs and said plurality of categorization sequences as outputs, wherein each categorization sequence has associated therewith a weighted value based on said output scores.

23. A non-transitory computer-readable medium for storing computer executable instructions that when executed by a computer perform a method of delineating document boundaries and identifying document types, said method comprising: automatically categorizing a plurality of document images into a plurality of predetermined categories in accordance witch classification rules for said categories; and automatically generating at least one identifier for identifying which of said plurality of document images belongs to which of said at least two categories.

24. The computer-readable medium of claim 23 wherein said at least one identifier comprises a computer-generated separation page which is inserted between document images to delineate images belonging to different ones of said plurality of categories.

25. The computer-readable medium of claim 23 wherein said at least one identifier comprises a computer-readable description that identifies a categorization sequence for said plurality of digital images in accordance with their categorization.

26. The computer-readable medium of claim 25 wherein said computer-readable description comprises an XML message.

27. The computer-readable medium of claim 23 wherein said at least one identifier comprises at least one computer-generated label that is electronically associated with at least one of said plurality of document images.

28. The computer-readable medium of claim 23 wherein said plurality of categories comprises at least two different form types used in a financial transaction.

29. The computer-readable medium of claim 28 wherein said plurality of categories further comprise first, middle and end page categories for each of said at least two different form types.

30. The computer-readable medium of claim 23 wherein said step of automatically categorizing comprises: producing an output score for each document image; and using a graph search algorithm to determine an optimum categorization sequence from a plurality of possible categorization sequences for said plurality of document images based on said output scores.

31. The computer readable medium of claim 30 wherein said output scores represent a probability that each document image belongs to at least one respective category from said plurality of categories.

32. The computer-readable medium of claim 30 wherein said step of using a graph search algorithm comprises using a graph structure to calculate a total output score, based on said output scores for each of said plurality of document images, for each said possible categorization sequence; and determining which categorization sequence yields the highest total output score.

33. The computer-readable medium of claim 30 wherein said output scores represent a conditional probability that each document image belongs to at least one respective category from said plurality of categories, wherein said conditional probability for each document image depends on at least one category chosen for at least one preceding or subsequent document image.

34. The computer-readable medium of claim 30 wherein said step of automatically categorizing further comprises applying a manually generated classification rule that eliminates at least one possible categorization sequence.

35. The computer-readable medium of claim 34 wherein said at least one possible categorization sequence comprises a starting page of a first document type followed by a starting page of a second document type before an ending page of the first document type is identified.

36. The computer-readable medium of claim 34 wherein said at least one possible categorization sequence comprises two consecutive pages of a first document type known to have a predefined number of pages.

37. A non-transitory computer-readable medium for storing computer executable instructions that when executed by a computer perform a method of delineating document boundaries and identifying document types, said method comprising:
automatically categorizing a plurality of document images into a plurality of predetermined categories in accordance with classification rules for said categories, comprising:
producing an output score for each document image; and
using a graph search algorithm to determine an optimum categorization sequence from a plurality of possible categorization sequences for said plurality of document images based on said output scores, comprising:
using a graph structure to calculate a total output score, based on said output scores for each of said plurality of document images, for each said possible categorization sequence; and
determining which categorization sequence yields the highest total output score; and
automatically generating at least one identifier for identifying which of said plurality of document images belongs to which of said at least two categories, wherein said graph structure is implemented using a finite state transducer wherein said plurality of document images comprise inputs and said plurality of categorization sequences comprise outputs.

38. The computer-readable medium of claim 37 wherein said graph structure is implemented using a weighted finite state transducer having said plurality of document images as inputs and said plurality of categorization sequences as outputs, wherein each categorization sequence has associated therewith a weighted value based on said output scores.

* * * * *

UNITED STATES PATENT AND TRADEMARK OFFICE
CERTIFICATE OF CORRECTION

| | | |
|---|---|---|
| PATENT NO. | : 8,693,043 B2 | Page 1 of 1 |
| APPLICATION NO. | : 10/742131 | |
| DATED | : April 8, 2014 | |
| INVENTOR(S) | : Schmidtler et al. | |

It is certified that error appears in the above-identified patent and that said Letters Patent is hereby corrected as shown below:

In the specification:

col. 10, line 5 replace "Ill." with --IL.--.

In the claims:

col. 15, line 31 replace "witch" with --with--.

Signed and Sealed this
First Day of July, 2014

Michelle K. Lee
*Deputy Director of the United States Patent and Trademark Office*